United States Patent [19]
Klatt et al.

[11] 3,788,296
[45] Jan. 29, 1974

[54] DEVICE FOR APPLYING MEDICAL SUBSTANCES TO THE NASAL MUCOSA

[75] Inventors: Peter Klatt, Kelkheim, Taunus; Karl Seeger, Hofheim, Taunus; Wolfgang Wilborn, Eppstein, Taunus, all of Germany

[73] Assignee: Farbwerke Hoechst Aktiengesellschaft vormals Meister Lucius & Bruning, Frankfurt/Main, Germany

[22] Filed: May 19, 1972

[21] Appl. No.: 255,077

[30] Foreign Application Priority Data
May 22, 1971 Germany.................. P 21 25 464.8

[52] U.S. Cl.................. 128/268, 128/206, 119/135
[51] Int. Cl...................... A01k 15/00, A61m 15/08
[58] Field of Search.... 128/140, 205, 206, 268, 135

[56] References Cited
UNITED STATES PATENTS

| 99,559 | 2/1870 | Goodman | 119/135 |
| 832,349 | 10/1906 | Thomas | 119/135 |
| 1,429,546 | 9/1922 | Stokes | 128/206 |
| 2,426,161 | 8/1947 | Biederman | 128/206 |
| 2,777,442 | 1/1957 | Zelano | 128/206 |
| 3,463,149 | 8/1969 | Albu | 128/206 |

FOREIGN PATENTS OR APPLICATIONS

| 886,056 | 1/1962 | Great Britain | 128/206 |
| 678,986 | 9/1952 | Great Britain | 128/206 |
| 1,254,549 | 1/1961 | France | 128/206 |
| 283,716 | 3/1931 | Italy | 128/206 |
| 816,887 | 7/1959 | Great Britain | 128/206 |

*Primary Examiner*—Aldrich F. Medbery
*Attorney, Agent, or Firm*—Curtis, Morris & Safford

[57] ABSTRACT

Device for the application of active substances via the mucosa or perorally and/or by aspiration, having a ring-like or clamp-like form suitable for being fixed in or on the nasal septum of animals and containing the active medical substance either applied to, imbedded in or incorporated into the body of said device.

11 Claims, 8 Drawing Figures

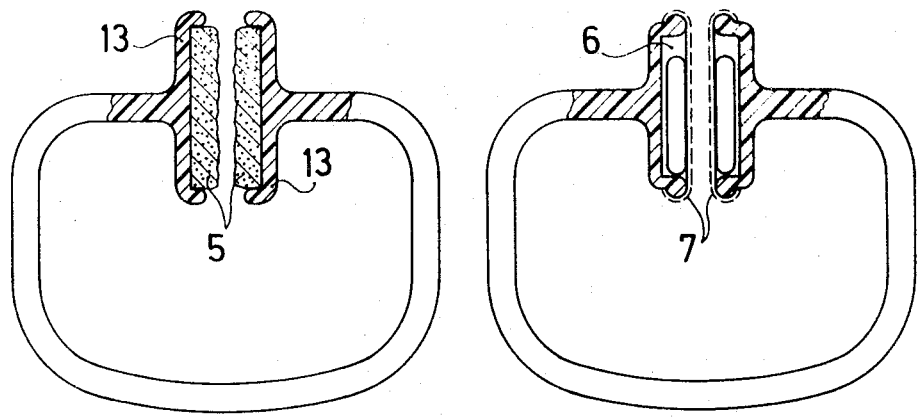
FIG. I    FIG. II
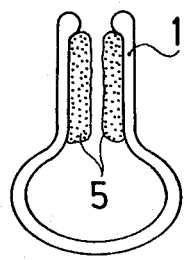
FIG. III
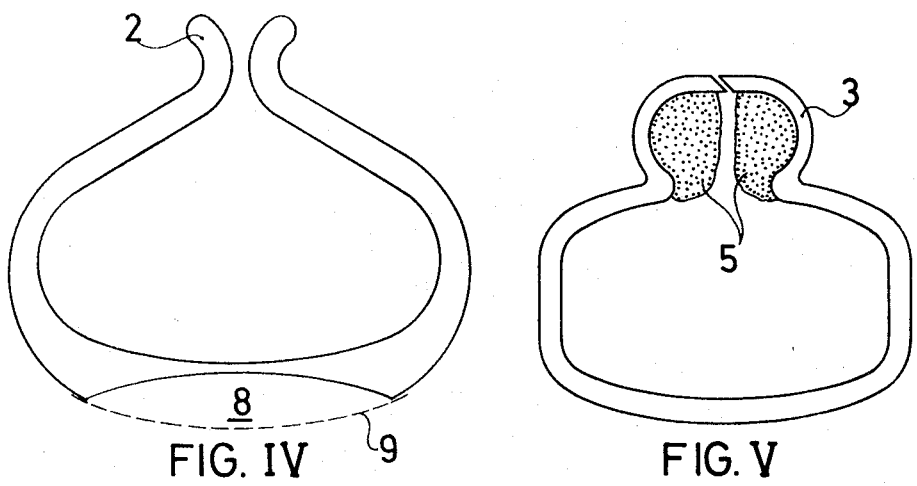
FIG. IV    FIG. V

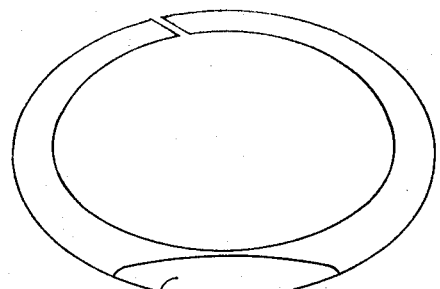
FIG. VI
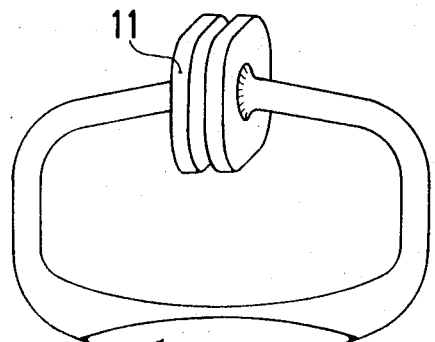
FIG. VII
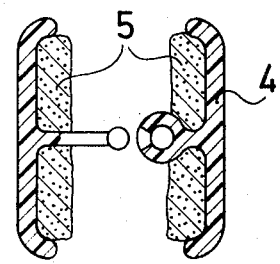
FIG. VIII

DEVICE FOR APPLYING MEDICAL SUBSTANCE TO THE NASAL MUCOSA

The present invention provides a device for the application of active substances to be born by animals, especially by livestock and domestic animals, in the anterior part of the nose, with or without piercing of the nasal septum.

In the prophylactic or therapeutic treatment of animals, for diagnostic purposes or for influencing body functions, for example the heat, it is often necessary to maintain a constant concentration of active substances in the blood and in the body tissue over a prolonged period of time and, if desired or required, to let suddenly decay this concentration of active substances. Active substances for the long term treatment have hitherto been administered by injections into the blood circulation or into the musculature or subcutaneously. Administration over the digestive tract is also usual. Even the application of active substances via the sexual and urinary system is known.

Thus, for example, in order to synchronzie the heat of live-stock such as cattle, sheep, etc., it is necessary to continuously apply gestagenic active substances over a period of time of about 14 days. When this medication is discontinued, a new cycle will start. The hitherto used forms of administration, peroral or by injection, do not permit a sudden discontinuation of the action of the active substance, because it is impossible to influence the depots in the first stomachs or in the body tissue. Moreover, with ruminants, the oral dose must be considerably increased by reason of the large volume of the rumen. Small sponges for application via the mucosa of the vagina can be used with sheep only. Such sponges, however, cause congestions of secretions. Owing to their insecure seat, they cannot be used for cows. Generally, the seat or any displacement of such small sponges can be checked with difficulty only. Subcutaneous implanation of active substance carriers implies a considerable expenditure of work and involves the risk of wound infections.

The above-described administration forms, which may be used for therapeutic or prophylactic purposes and for influencing body functions, have in common that they imply a large amount of work, that they are time-consuming and very difficult to apply, especially if, for example, grazing livestock is to be treated.

Now, we have found that the above-described disadvantages can be overcome by using for the application of active medical substances via the mucosa or by oral and/or aspiratory absorption a ring-like or clamp-shaped device which is fixed in or on the nasal septum of animals and which contains either applied onto, imbedded in or incorporated into its surface or its supporting body, the active substance to be applied.

The above, and other features and advantages of this invention, will be apparent in the following detailed description of illustrative embodiments thereof which are to be read in connection with the accompanying drawings, whrein:

FIGS. I–VIII each illustrate a separate embodiment of nasal clamps constructed in accordance with the invention.

The nasal clamps used according to the invention have an oval to rectangular form, in the latter case the corners being rounded (cf. for example, FIGS. I and IV). They also may be so shaped that both terminal parts of the clamp (1) are parallel and are not resting with their ends only on the nasal septum but with parallel parts of the clamp having any desired length.

In order to improve the seat, the ends of the clamp are generally reinforced like a knob (FIG. IV, 2), especially if merely the ends of the clamp are resting onto the nasal septum.

With a view to the anatomical condition of the nose, it is preferred to use, for example, the form illustrated by FIGS. I and IV for greater animals, for example cattle, while a clamp as illustrated by FIG. III is preferred for smaller animals, for example sheep. Of course, these forms, if enlarged or diminished to scale, may also be used for the other species of animals.

Clamps have the advantage of being more easy to apply by insertion, without a piercing of the nasal septum being necessary. If it is advisable with a view to the species of animals and if there are no medicinal indications against a perforation of the nasal septum, the ring-like, closed preparation carriers of the invention may be used (cf. for example, FIGS. V and VI). In principle, the form of the rings corresponds to that of the clamps. They may also be oval (cf. FIG. VI) or approximately rectangular, in the latter case the corners being rounded, (cf. FIG. V) and may also rest on the nasal septum with a part running parallel to it (cf. FIG. V, 3).

The rings are closed in the manner usually employed for nasal rings in livestock management.

If the part of a clamp or of a ring which is outside surrounding the nasal septum, raises difficulties with particularly vivid or wild animals, this surrounding part may be omitted and the connection of the remaining ring system may be effected as illustrated in FIG. VIII. It is suitable to give these parts which are connected in the manner of a push-button system (FIG. VIII, 4) the form of disks.

The active substance can be fixed to the device of the invention in various ways. Preferably it is contained in a sponge (5) which is pressed against the nasal septum by the ends of the clamp (cf. FIGS. I and III) or by a part of a ring running parallel to the nasal septum (cf. FIG. V). Instead of a sponge, it is also possible to use, for example, a pad.

The sponge serving for taking up the active substance may consist, for example, of a porous plastic material, for example polyurethane foam, sintered polyethylene; it may also be a sponge of polyvinyl alcohol or viscose. Such a carrier for the active substance may also be used with the simple clampless form (cf. FIG. VIII). The sponge or the pad is absorbing the active substance, e.g., as a solution, suspension or gel.

It is also possible to place the active substance as such or in the form of a galenic preparation, for example a gel or a tablet, in a cavity (6) located in one part of the device of the invention adjoining the nasal septum, this cavity being covered, for example by gauze or a sieve plate (7), etc. Such cavities for taking up the active substance may also be located, for example, in part 1 (FIG. III), 3 (FIG. V) or 4 (FIG. VIII) resting on the nasal septum.

With the described forms of devices, the active substance is absorbed directly via the mucosa of the nose or, if it is an easily volatile active substance or an easily volatile preparation, also by aspiration.

If it is intended to apply the active substance slowly and orally by the reflex licking of the animals, it can be fixed onto the front side of the part of the clamp or ring which is outside surrounding the nasal septum. It may be placed there, for example, as such or in the form of a preparation, for example a gel, in a cavity (cf. FIG. IV, 8) and covered, for example, with a sieve plate (9). It may also be fastened in the form of a "mineral lick," known in livestock management, on the front side of a clamp or ring (cf. FIG. VI, 10).

It is also possible to give the ring or the clamp, especially the part adjoining the nasal septum or the part surrounding outside the nasal septum, the form of a matrix medicament carrier as the carrier of the active substance (cf. FIG. VII, 11 and 12) from which the active substance is absorbed directly over the nasal mucosa by diffusion or by licking. Of course, it is also possible to give only the part adjoining the nasal mucosa or the front side of the ring or clamp the form of a matrix medicament carrier. If a ring is used, for example the part piercing through the nasal septum 3 (FIG. V) may be such a matrix.

The device of the invention can be prepared from any material, preferably from plastic materials. As plastic materials, there may be used in particular polyolefins, preferably polyethylenes of lower and higher density, polypropylene, and furthermore, for example, hard PVC and polystyrene. Other materials such as rubber, horn, light metals such as aluminum, may also be used.

The use of plastic materials is advantageous by reason of their physiological indifference and their indifference towards the active substances. Their elasticity which is essential for the fixation by pressing of the clamp onto the nasal septum and the possibility of providing the devices with striking colours make plastics a very suitable material for the devices of the invention.

A clamp-like embodiment of the device of the invention, for example, for larger animals may have, for example an outer diameter of the oval form of about 60 to 80 mm and an inner diameter of about 40 to 55 mm. The cross section of the clamp, which may be oval, round or rectangular, is about 100 sq. mm, the part surrounding the nasal septum at the outside in general having a somewhat smaller diameter. The disk-like enlargements of the ends of the clamp (cf. FIG. I, 13) have preferably a distance from each other of about 10 to 25 mm, the disk-like enlargement 13 having a diameter of, for example, 2 to 4 cm. The size of the surface of the disk depends on the size of the carrier of the active substance placed between them and which, if a plastic foam is used, may have a thickness of, for example, about 5 to 15 mm. The size of the carrier of the active substance may be of course greater or smaller in which case the interstice between the plates 13 is to be varied correspondingly. For smaller animals, for example sheep, a reduction to scale of the above-described devices of, for example, 1:0.2 – 0.3 may be used, or any other embodiment of the device, for example that illustrated by FIG. III.

The group of animals for which the device of the invention can be applied is extremely great, since this device permits the application of the most various active substances. The various fields of application are illustrated hereafter by some examples. For influencing the heat, gestagens and oestrogens may be administered, such as chloromadinone acetate or medroxyprogesterone acetate, for promoting fattening, there may be administered androgenic substances, for prophylactic purposes there may be administered, for example anti-tympanics, for example certain silicones, or for therapeutic and prophylatic purposes, there may be administered antiparasitic agents, for example, certain phosphoric acid esters. The above-listed substances which are used for a long term treatment of animals are indicated by way of example only, since it is well understood that a great number of other active substances may also be used.

In contradistinction to the methods of application of the state of the art, which have been discussed in the introductory part, the device of the present invention is distinguished by essential advantages in the administration of active substances which have to be applied over a prolonged period of time. The clamps and rings of the invention can be easily inserted. The seat and remaining of them on the nose can be easily controlled. Removal of the devices and therewith a rapid discontinuation of the treatment which is in many cases important is simple and without problems. In contradistinction to the known application forms, the manipulation of the devices of the invention requires only little time and work. When giving the rings a corresponding colour, animals with the same medication can be easily found out in a herd. With a view to the possibilities of varying the shape of the device and of applying the active substance, the device of the present invention offers a very large variety of application regarding the species of animals to be treated and the forms of application.

We claim:

1. A device for the application of medically active substances to animals via the nasal mucosa comprising a pair of opposing medicament carrier members for respectively supporting a medically active substance directly adjacent to and in juxtaposition with the mucosa on opposite sides of the nasal septum of an animal and means for operatively interconnecting said carriers and for supporting the carriers on the nasal septum, said interconnecting means including a pair of spaced generally oppositely directed support arms, said carrier members being respectively mounted opposite to each other on said support arms at right angles thereto whereby said carrier members extend generally coextensive to each other, said support arms and said carrier members being located and dimensioned to space the opposed carrier members slightly apart from one another to receive the nasal septum of an animal therebetween with the opposed portions of said carrier members in direct contact with said nasal septum to apply said medically active substance thereto and to cooperate simultaneously with said interconnecting means to hold said device on said nasal septum.

2. A device as defined in claim 1 wherein said carrier members comprise parallely extending disk like enlargements having cavities formed therein opening towards each other and containing said active substance, said enlargements being spaced from each other to receive the nasal septum of an animal therebetween, thereby to apply said substances directly to the animal's nasal mucosa.

3. The device as defined in claim 2 wherein said means for interconnecting and supporting said carriers comprises a ring-like member formed of a resilient material operatively connected at opposite ends thereof to said disk-like carrier members, said opposite ends of said ring-like member extending towards each other and defining said oppositely directed support arms, said support arms being relatively straight and in substantially axial alignment whereby said ring forms a clamp with said carrier members to hold said carrier members in position directly against the nasal septum of the animal.

4. The device as defined in claim 3 wherein said ring-like member has a generally rectangular configuration.

5. The device as defined in claim 3 wherein said ring-like member extends outside of the nasal passages of said animal when supporting said carrier members on the nasal septum, said ring-like member having an open cavity formed in the portion thereof outside the animal's nasal passage, said open cavity containing said active substance mounted therein and thereby presented for licking by the animal.

6. The device as defined in claim 5 including a porous pad of material positioned in each of said cavities and containing said active substance.

7. The device as defined in claim 5 wherein an active substance is contained in each of said cavities and a layer of permeable material is positioned over the open end of said cavities for engagement against the nasal septum.

8. The device as defined in claim 7 wherein said active substance is a galenic preparation.

9. The device as defined in claim 1 wherein said active substance is selected from the group consisting of gestagens, androgens, oestrogens, antitympanic and antiparasitic agents.

10. The device as defined in claim 2 wherein said means for interconnecting and supporting said carrier members comprises cooperating male and female connector members respectively formed in said disk-like carrier members, said male member being adapted to pierce the nasal septum and engage said female member to support said carrier members on the nasal septum.

11. A device as defined in claim 3 wherein said resilient material is plastic.

* * * * *